March 14, 1950  W. G. SAWYER ET AL  2,500,578
DEVICE FOR RELAXING PARTS OF THE HUMAN BODY
Filed Nov. 18, 1946

INVENTORS
WILLIAM G. SAWYER
EDWARD LASKE

ATTORNEYS

Patented Mar. 14, 1950

2,500,578

UNITED STATES PATENT OFFICE 2,500,578

DEVICE FOR RELAXING PARTS OF THE HUMAN BODY

William G. Sawyer, Detroit, and Edward Laske, Birmingham, Mich.

Application November 18, 1946, Serial No. 710,586

1 Claim. (Cl. 128—56)

The invention relates to devices for relaxing parts of the human body and refers more particularly to devices for loosening or relaxing the ligaments and muscles adjacent the spine.

The invention has for one of its objects to provide an improved device which is of a size to be readily grasped by one hand of an operator or manipulator and which is also so constructed that the contacting member engageable with the human body can easily be applied under the desired pressure to effect the loosening or relaxing of the ligaments or muscles even when deep-seated.

The invention has for another object to provide an improved construction of the body contacting member and mounting for the contacting member.

The invention has for a further object to provide an improved mechanism for driving the contacting member at the desired speed constructed to occupy a restricted space enabling the housing to be grasped by one hand of an operator or manipulator.

With these as well as other objects in view the invention resides in the novel features of construction, combination and arrangement of parts, as more fully hereinafter set forth.

Figure 2:
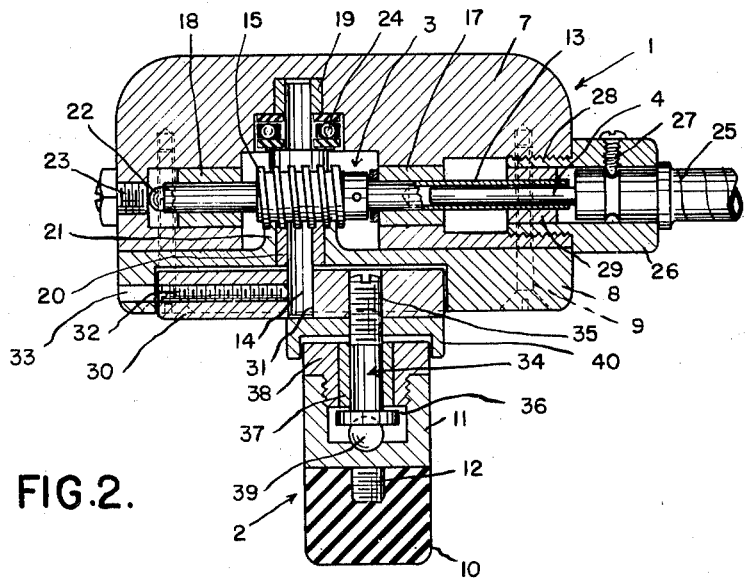
Figures 2 and 3 are transverse vertical sections through the device.
Figure 1:
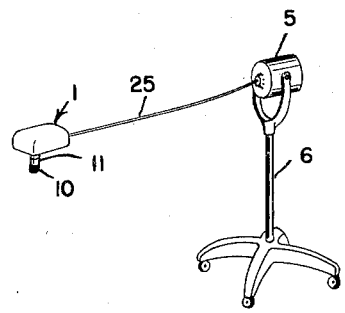
Figure 1 is a perspective view of a device embodying the invention.
Figure 3:
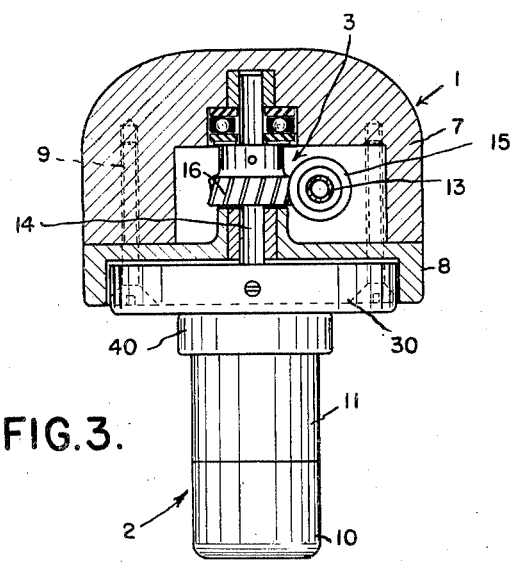

The device, as illustrated in the drawings, comprises the housing 1, the member 2 for contacting the human body, the mechanism 3 for driving the body contacting member, the drive shaft 4 connected to the driving mechanism, and the electric motor 5 connected to the drive shaft. The electric motor 5 is universally mounted on the portable stand 6 and the drive shaft is flexible so that the operator or manipulator has considerable freedom in engaging the desired part of the human body with the body contacting member.

The housing 1 is formed of the upper and lower sections 7 and 8 respectively secured together by suitable means such as the screws 9. The housing preferably has rectangular top and bottom faces and also rectangular opposite side faces and has over-all dimensions which are restricted to enable the operator or manipulator to grasp the housing by hand with the palm over the top face and the fingers along the side faces.

The body contacting member 2 extends transversely of and below the bottom face of the housing 1 and comprises the body contacting element 10 and the holder element 11, the two being secured together by suitable means including the depending axial stud 12 upon the holder element threadedly engaged by the body contacting element.

The driving mechanism 3 is located within the housing 1 and comprises the horizontal and vertical shafts 13 and 14, and the intermeshing worm 15 and worm wheel 16 fixedly secured to the shafts 13 and 14 respectively. The shaft 13 is journalled in the spaced aligned bearings 17 and 18 in the upper housing section 7, and the shaft 14 is journalled in the spaced aligned bearings 19 and 20 in the upper and lower housing sections 7 and 8 respectively. The latter section preferably has the upwardly extending annular flange 21 providing an extended seat for the bearing 20. 22 is an anti-friction end thrust bearing for the shaft 13, this bearing being in the nature of a ball seated in the end of the shaft and abutting the inner end of the screw 23 which is threaded into the upper housing section 7. 24 is an anti-friction end thrust bearing for the shaft 14 preferably in the nature of a ball bearing located in the upper housing section 7 and abutting the upper end of the hub of the worm wheel 16. The shaft 13 is suitably connected to the drive shaft 4 as by telescoping the former over the latter and providing both with engaging flat faces. The flexible housing 25 for the drive shaft 4 is secured in the fitting 26 by suitable means such as the screw 27, this fitting extending transversely of a side face of the housing section 7 and having the reduced portion 28 threaded into this section. 29 is a bearing within the reduced portion 28 for the adjacent end of the shaft 13.

For operatively connecting the body contacting member 2 to the driving mechanism 3 there is provided the rotatable disk 30 which extends upwardly within a recess in the portion of the lower housing section 8. This disk is formed with the central or axial hole 31 for receiving the lower end of the shaft 14 and the shaft is secured to the disk by the suitable means such as the set screw 32 threadedly engaging the disk and abutting the shaft. The lower housing section has the transverse hole 33 providing for insertion and removal of the set screw. 34 is a screw extending transversely of and depending from the disk 30 and having the shank 35 threadedly engaging the disk at a distance from the hole 31. The screw has the head 36 which is adapted when the device is not in use to support the bushing 37 journalled on the lower portion of the shank 35. 38 is a carrier fixedly secured to the bushing by having a press fit thereon. This carrier has a reduced lower end portion for threadedly engaging the holder element 11.

For taking care of the end thrust of the body contacting member when in operation, the anti-friction bearing 39, preferably in the nature of a ball, is provided between the head 36 of the screw 34 and the bottom wall of the holder element 11.

40 is a cup-shaped guard threaded upon the shank 35 of the screw 34 and extending over the hole 31 in the disk 30 and having a depending flange encircling the upper end portion of the carrier 38.

From the above description it will be seen that we have provided an improved device in which the housing is of a size to enable an operator or manipulator to grasp it by hand with the palm over the top face and the fingers along the side faces so that the operator or manipulator may readily handle the device and position the body contacting member at the desired spot and also easily apply the necessary pressure to accomplish the loosening or relaxing of the ligaments or muscles by deep massage of the same; also, that the worm gearing which serves as reduction gearing is compact and facilitates keeping the size of the housing within limits to be grasped by one hand of the operator or manipulator. Furthermore, it will be seen that we have provided a novel construction of body contacting member and thrust bearing therefor, as well as other improved features including the guard and the thrust bearings for the shafts of the worm gearing.

What we claim as our invention is:

A device for relaxing parts of the human body comprising: a housing, a rotatable disk, mechanism within said housing for driving said disk, a screw offset from the axis of said disk and having a shank portion threadedly engaging said disk and an enlarged portion spaced from said disk, a carrier, a bushing between said disk and enlarged portion of said screw for journalling said carrier on said screw, a holder element secured to said carrier, an end thrust bearing between said enlarged portion of said screw and said holder element, and a body contacting element on said holder element.

WILLIAM G. SAWYER.
EDWARD LASKE.

REFERENCES CITED

The following references are of record in the file of this patent:

UNITED STATES PATENTS

| Number | Name | Date |
| --- | --- | --- |
| 1,964,855 | Moore | July 3, 1934 |
| 2,043,114 | Ruttger-Pelli | June 2, 1936 |
| 2,034,758 | Hicke | Mar. 24, 1936 |
| 2,232,474 | Rauh | Feb. 18, 1941 |